United States Patent
Murphy et al.

(10) Patent No.: US 6,915,448 B2
(45) Date of Patent: Jul. 5, 2005

(54) STORAGE DISK FAILOVER AND REPLACEMENT SYSTEM

(75) Inventors: Ciaran Murphy, Dublin (IE); Richard A Gahan, Gory (IE); John Healy, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 483 days.

(21) Appl. No.: 10/128,352

(22) Filed: Apr. 24, 2002

(65) Prior Publication Data

US 2003/0041283 A1 Feb. 27, 2003

(30) Foreign Application Priority Data

Aug. 24, 2001 (GB) .............................................. 0120619

(51) Int. Cl.$^7$ ................................................ G06F 11/00
(52) U.S. Cl. ............................................ 714/6; 714/41
(58) Field of Search ............................. 714/6, 13, 1, 2, 714/41; 711/114, 112

(56) References Cited

U.S. PATENT DOCUMENTS

| 5,148,432 A | * | 9/1992 | Gordon et al. ................. 714/7 |
| 5,787,242 A | * | 7/1998 | DeKoning et al. .............. 714/5 |
| 5,870,537 A | | 2/1999 | Kern et al. |
| 6,154,853 A | * | 11/2000 | Kedem ........................... 714/6 |
| 6,530,004 B1 | * | 3/2003 | King et al. .................. 711/165 |

FOREIGN PATENT DOCUMENTS

| GB | 2278228 A | 11/1994 |
| GB | 2312317 A | 10/1997 |
| GB | 2343265 A | 5/2000 |

* cited by examiner

Primary Examiner—Scott Baderman
Assistant Examiner—Paul F. Contino
(74) Attorney, Agent, or Firm—Nixon & Vanderhye P.C.

(57) ABSTRACT

A storage assembly includes a plurality of multi-unit storage device is provided with a failover procedure that does not require hot-swap capability. Individual units are aggregated into a storage array by an aggregation procedure such as RAID. When a failure occurs data from the failed unit is transferred to a hot spare unit. Also, data from other units is transferred by simulating failure of those units and then the complete device can be removed. In small storage networks all the units may be aggregated as a single array and a spare auxiliary device is summoned and integrated into the array prior to the simulated failure. In larger systems there may be two layers of aggregation and failover is run by the second level of aggregation.

13 Claims, 9 Drawing Sheets

STORAGE DISK FAILOVER AND REPLACEMENT SYSTEM

FIELD OF THE INVENTION

This invention relates to storage devices and to a system for replacement of failed devices that are not hot-swappable, without taking the storage off-line.

BACKGROUND OF THE INVENTION

It is now generally the case that storage systems need to be available constantly. This means that in a storage area network (SAN) the individual storage disks or devices need to be hot-swappable in the event of failure in order to avoid having to take the storage off-line. A high proportion of SANs use SCSI or Fibrechannel disks which are hot-swappable but they are expensive.

A cheaper disk type is IDE and with the advent of iSCSI, aggregation of IDE based storage devices into a SAN is attractive. Hot swap capability for IDE drives is being developed but this imposes an expense and space restriction, including having more expensive mechanical components with slide rails.

It is desirable to be able to use cheaper forms of disk storage, without hot-swap capability, but to be able to replace failed disks without down time.

SUMMARY OF THE INVENTION

According to the invention there is provided a storage assembly comprising a plurality of multi-unit storage devices running an aggregation and failover procedure that does not require hot-swap capability, the aggregation and failover procedure including (i) aggregation of individual units into an aggregated storage array, ii) responding to failure of a unit by (a) transferring, with reconstruction as required, data from the failed unit to a hot spare unit instigating a failover transfer of data from all other units within the same storage device as the failed unit on to hot spare units established in another device, (b) summoning removal of the device with the failed unit subsequent to completion of the failover transfer.

In an embodiment particularly suited to larger storage networks there is a layered or nested aggregation with individual units aggregated into a plurality of aggregated arrays, usually consisting of a complete multi-unit device, and the plurality of arrays or devices) are aggregated by a further aggregation procedure.

Security for data on the device with the failed disk is provided by deleting data after the transfer process. Only the genuinely failed disk then retains data, but that would be difficult to recover from the format left after the failover, which would be a series of RAID strips, or the equivalent from an alternative aggregation control.

BRIEF DESCRIPTION OF THE DRAWINGS

The invention is now described by way of example with reference to the accompanying drawings in which.

Figure 1:
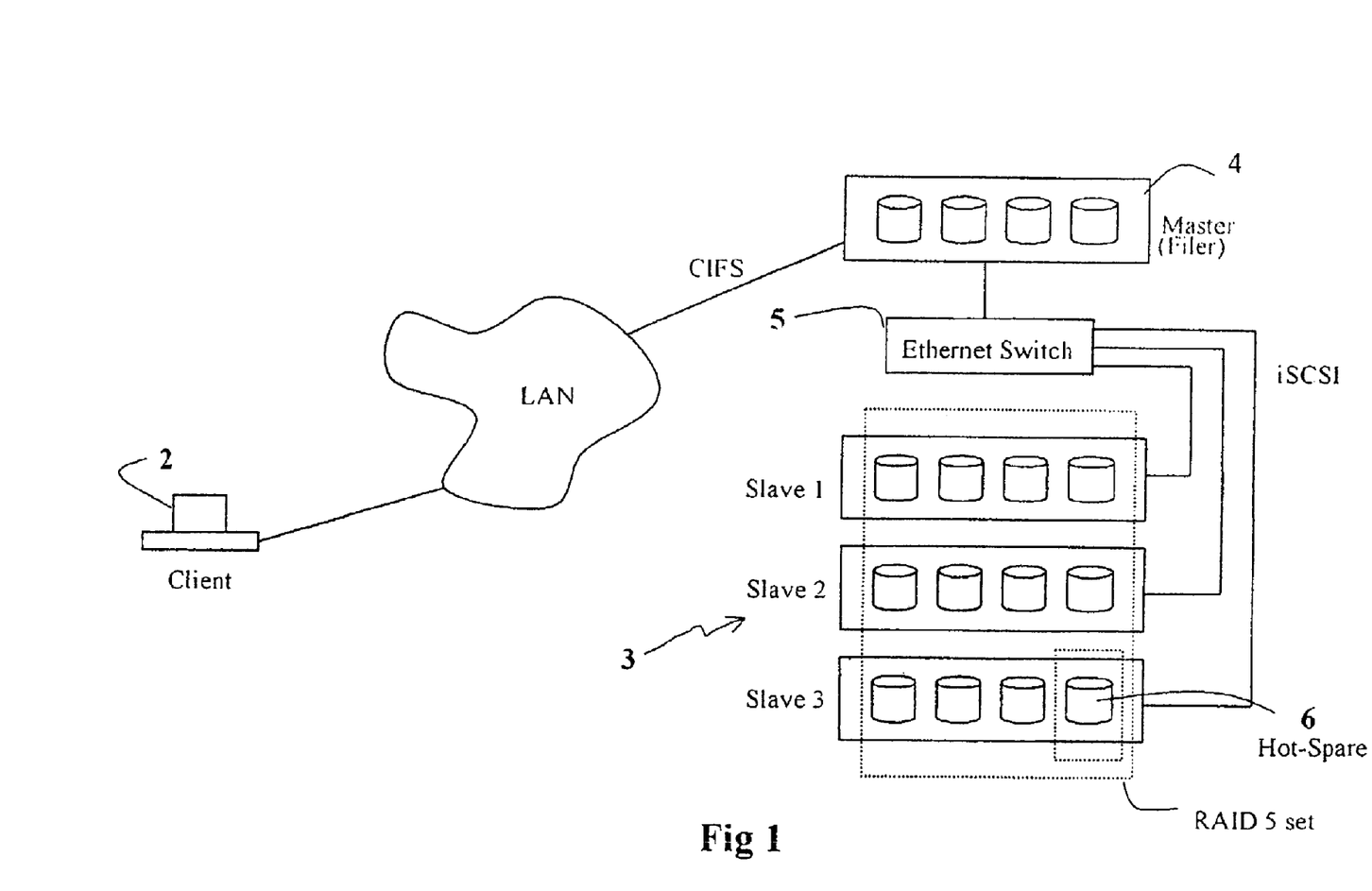
FIG. 1 is a schematic diagram of a SAN, attached to a LAN, with an integrated array of non hot-swappable disks.

FIG. 1 shows a local area network (LAN), 1 to which a variety of devices are attached, such as exemplary client terminal 2, and a storage area network (SAN) shown generally as 3. Within the SAN there is a master or filer device 4 that interfaces directly to the LAN and operates at file level with, say, CIFS protocol. The arrangement of the LAN, or other network, can be of any type. The master filer is connected via a switch 5 to a plurality of storage devices, indicated as slave 1, slave 2 and slave 3. The slaves each contain multiple storage units such as disk drives, none of which are hot-swappable, thereby enabling very cost effective storage.

Traffic between master and slaves is block level and any suitable block protocol may be used. However, if the Ethernet medium is used, the block protocol can be iSCSI.

The storage is aggregated by running a suitable control program such as RAID (Redundant Array of Integrated Disks). In this embodiment which is assumed to be relatively small, RAID is run within the master filer and each of the disks in the multi-disk slave devices belongs to the RAID set. Various RAID set-ups are possible, but in the embodiment it is assumed that the disks all belong to a RAID 5 set and that one of the disk drives is nominated as a hot-spare. In the Figure, this is the fourth drive, referenced 6, of slave 3. More than one such hot-spare may be nominated, especially if the SAN is larger, but an advantage of the present invention is that is can minimise the requirement for hot spares.

Figure 2:
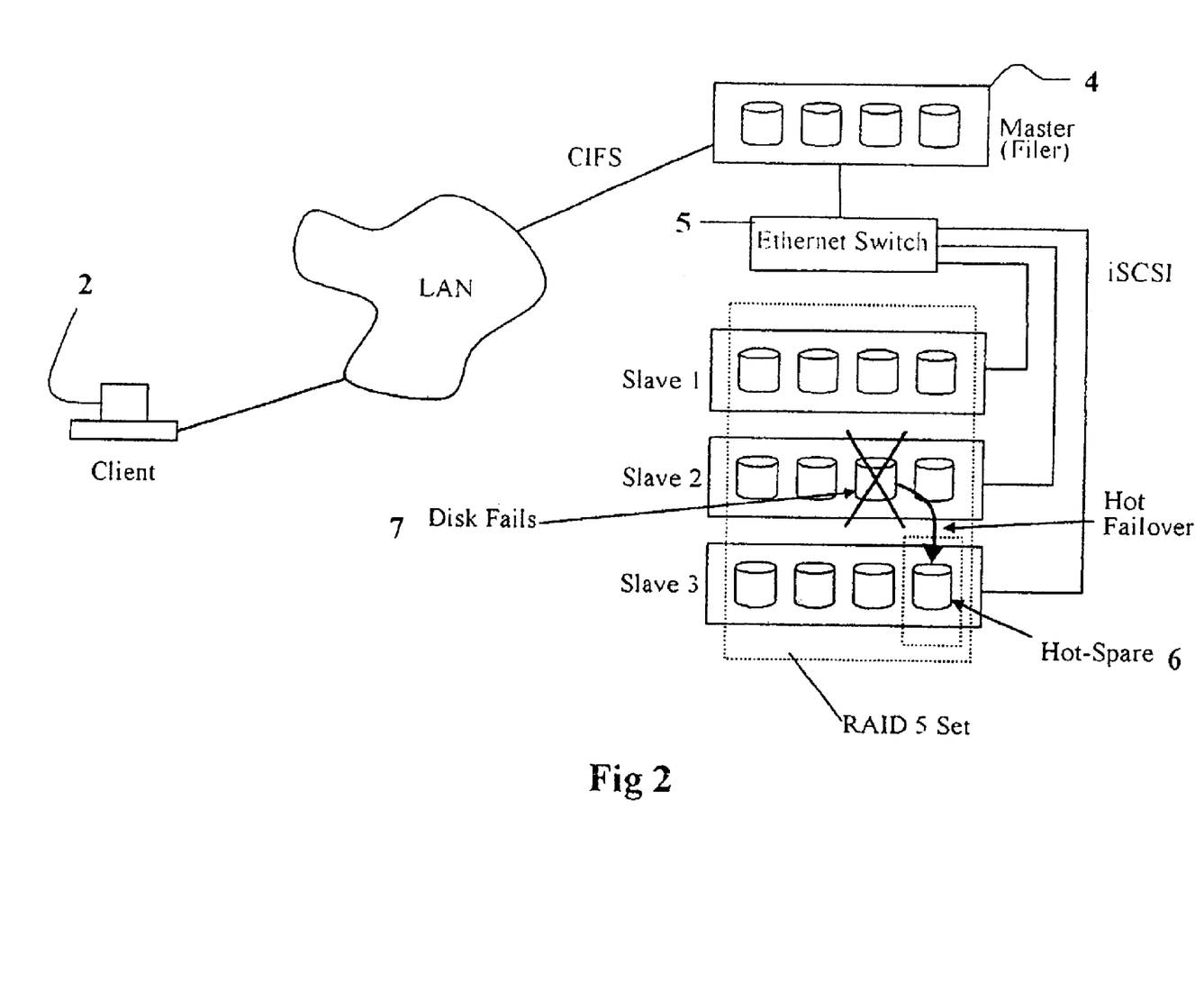
FIG. 2 shows the SAN of FIG. 1 with a disk failure.

In the event of a failure of a disk, shown in FIG. 2 as the third disk of slave 2, referenced 7, the management software of the SAN detects this and informs the RAID set of a failure of one of its devices. The RAID set immediately starts to reconstruct the data onto the hot spare 6, and continuous availability of the storage is maintained in the immediate aftermath of the failure. This is the present state of the art. As the disks are not hot-swappable the SAN is now running without (or with reduced) hot spare capacity and repeated failures could result in loss of data and storage on an uneconomic number of hot spares needing to be provided. Replacement of the disk requires shut down of the relevant slave device which would result in loss of storage facility of the unfailed disks in the device. Alternatively replacement can be done during a routine maintenance shut down, but it is desirable not to have such shut downs with significant frequency, or in many instances at all.

Figure 3:
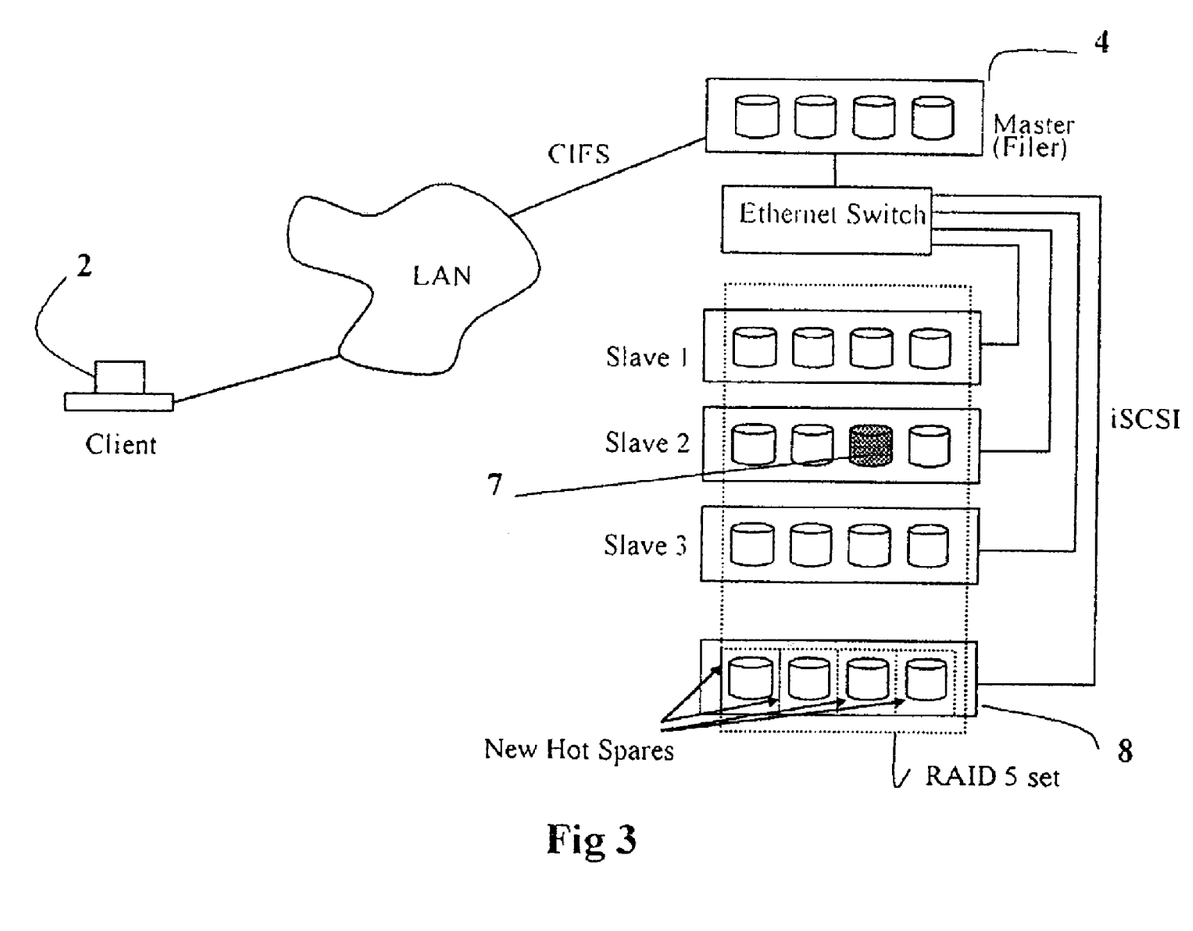
FIG. 3 shows the SAN with the addition of an extra device.
Figure 8:
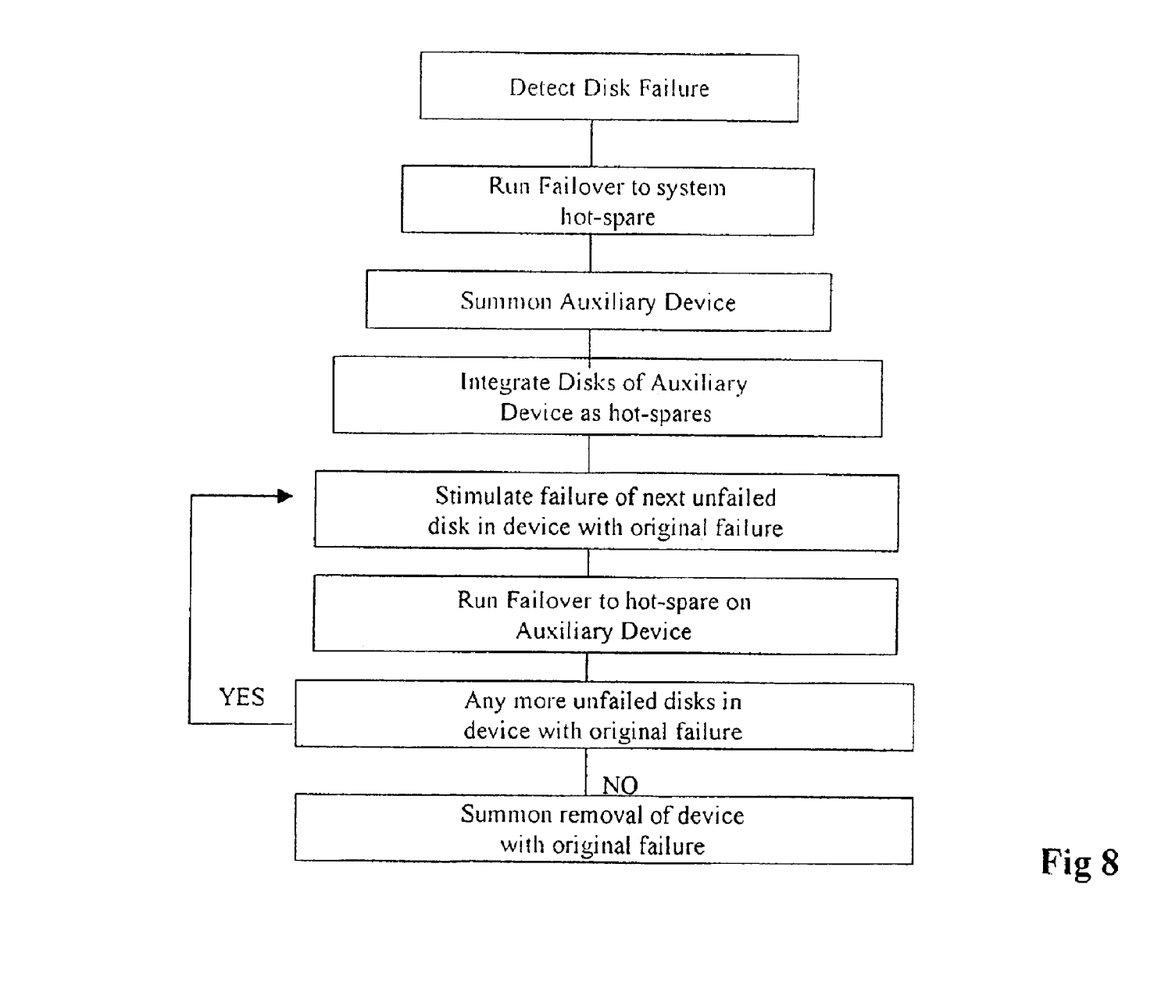
FIG. 8 is a flow diagram of the steps taken in the embodiment of FIGS. 1 to 6.

In a first embodiment of the invention, when there is a disk failure and failover to a hot spare, this is recognised by the management software which executes an algorithm illustrated in FIG. 8. The first two steps, detecting disk failure and running failover to the system hot spare has already occurred. Then the next step establishes a new or auxiliary multi-disk device. The establishment may be the posting or commissioning of a request or an automated order for a device, it is not normally the case that the device is already attached to the SAN but in some circumstances there may be arrangements for floating spares. When the auxiliary multi-disk device is established it is connected to the SAN as a further slave, as shown in FIG. 3 with reference 8; and is integrated into the existing RAID set with each of the disks as a new hot spare. It will be appreciated that means for connecting the additional device to switch 5 is available. The integration process will generally run under the control of RAID and the completion be reported to or detected by the management software.

Figure 4:
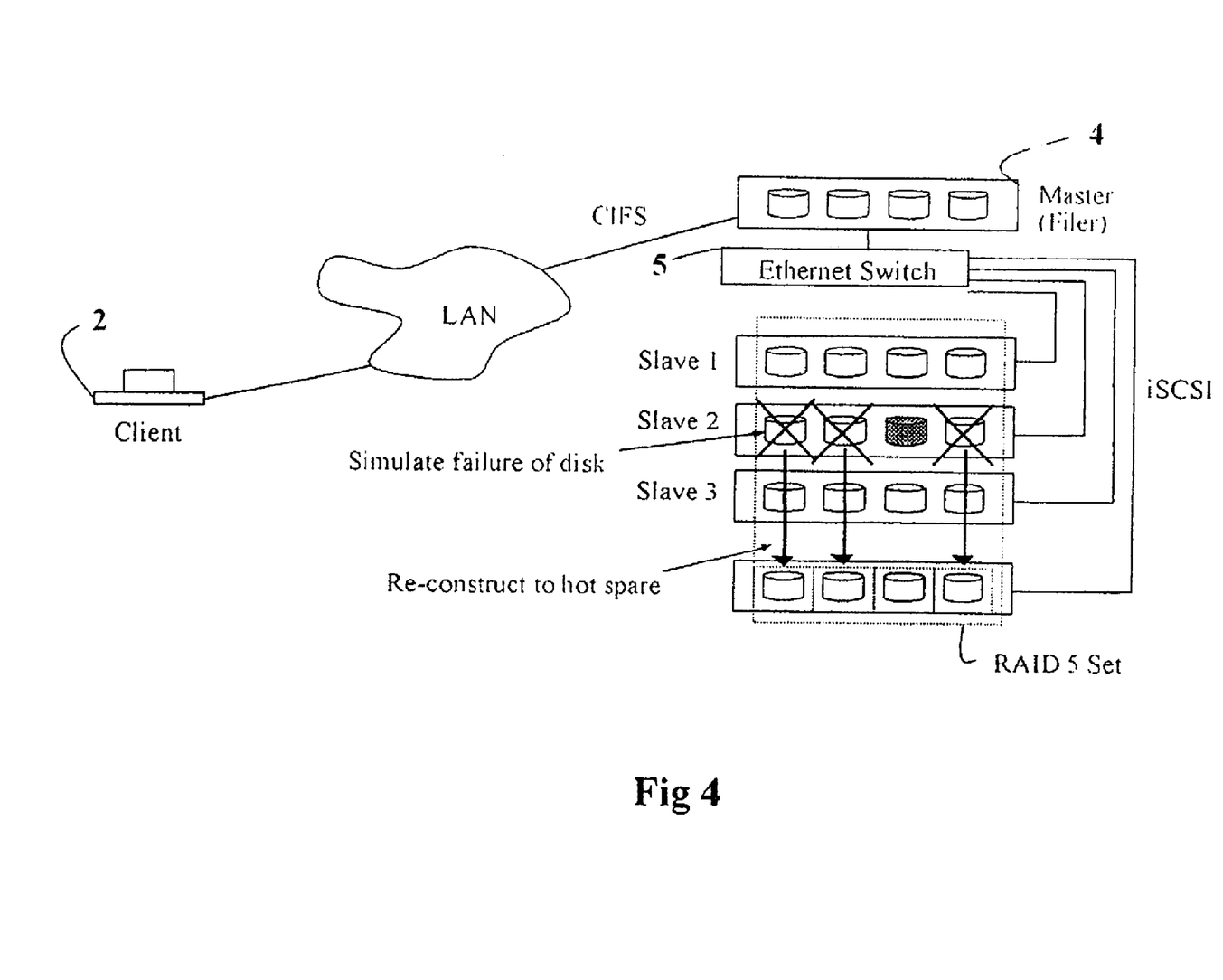
FIG. 4 illustrates the progressive transfer of data to the extra device from the device with a failure.

Once the auxiliary device's disks have been included as hot spares, the failover algorithm simulates a failure of the data on the good disks in the device containing the failed disk, and their data is transferred to the new hot spares. This is done in this embodiment of the invention by simulated failure of the good disks of the slave 2 drive in turn, as shown in FIG. 4 where the data from the three good disks of slave 2 has been transferred by a failover sequence on to three of the new hot spares. This is done sequentially rather than all at once as the RAID 5 set up is not expecting multiple simultaneous failure and is looking at the disks as the basic RAID 5 unit. As the disks are not actually failed, data reconstruction is not necessary and the management software may enable a less arduous read and write failover to be utilised by RAID.

Once the slave 2 good disks have been through their simulated failure, data on them is deleted. This may be done as their individual reconstructions or transfers are completed or once the data from the last good disk of the device has been transferred. Data will remain on the disk that suffered the original failure but as this data will generally have been reconstructed to the hot spare it will now be in the form of a series of intermittent RAID 5 stripes from which it is hard to recover data.

Figure 5:
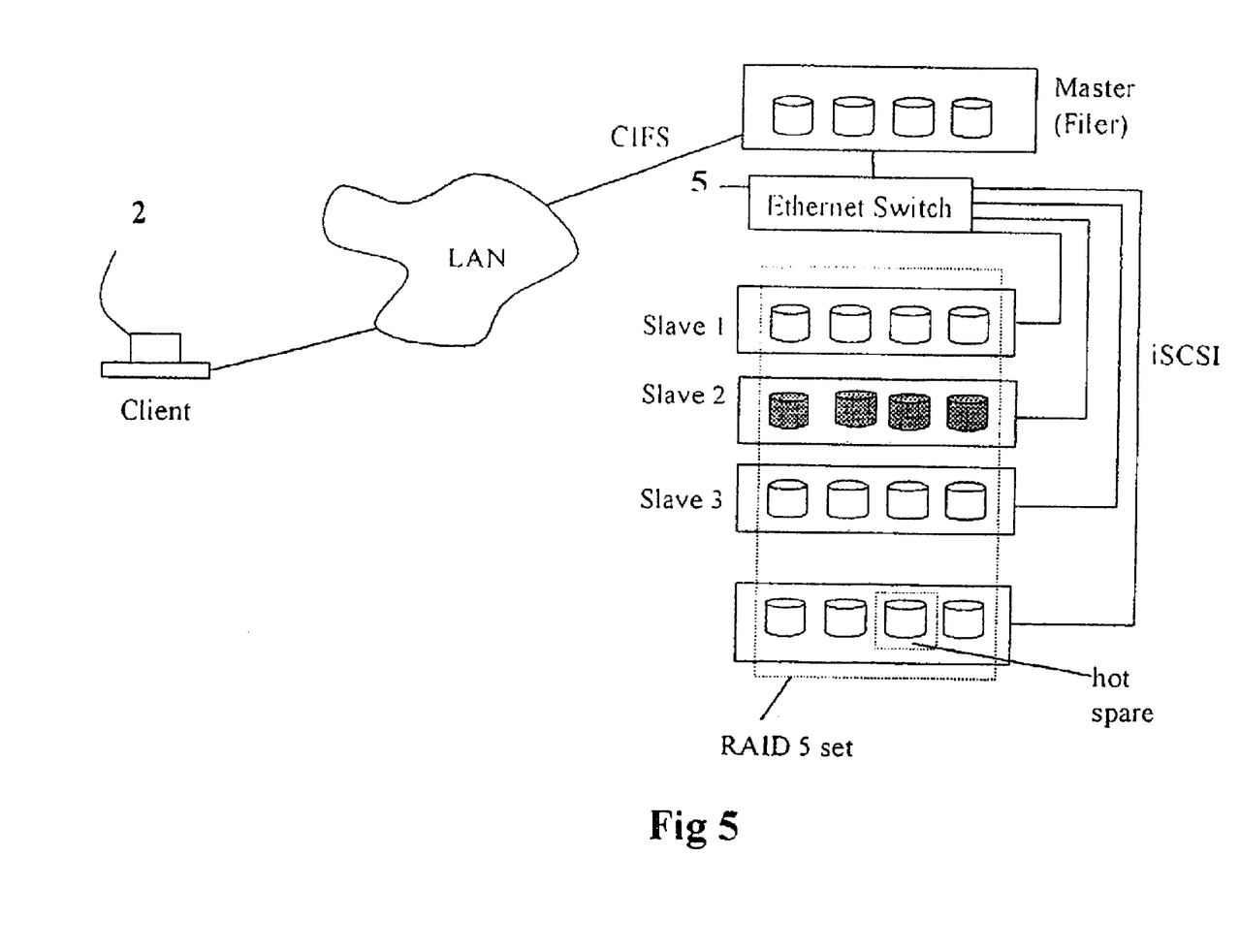
FIG. 5 illustrates the SAN after completion of the transfer.
Figure 6:
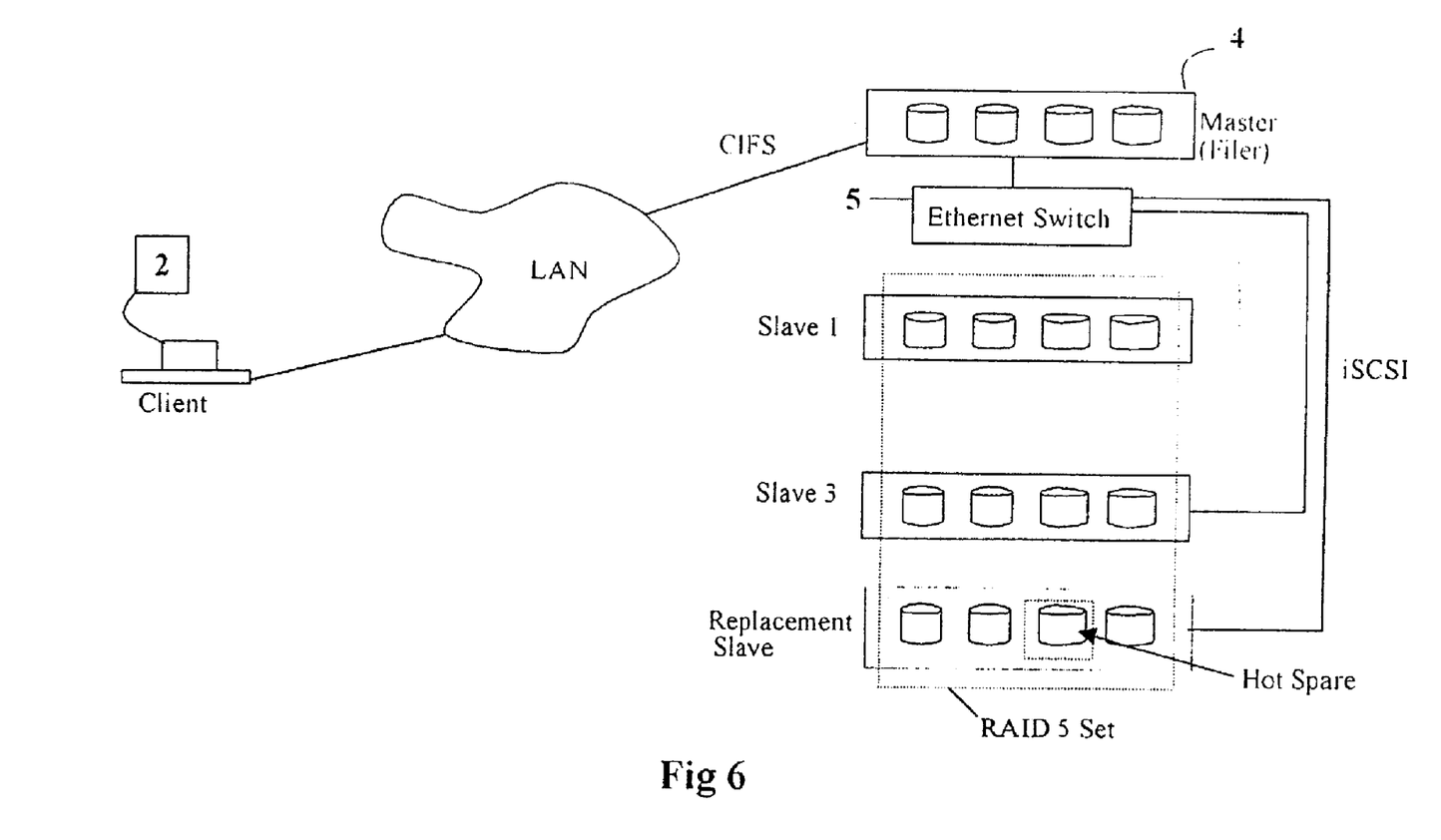
FIG. 6 illustrates the SAN after removal of the failed device.

The management system now indicates that transfer of data from slave 2 is complete and turns off the device so that it can be removed and the faulty drive replaced offline. A suitable indication is provided by the management system. This leaves the SAN as shown in FIGS. 5 and 6 with the replacement slave with the data from the three good drives of former slave 2 and its fourth drive being an available hot spare to replace the hot spare used in the original failover. In FIG. 6 the faulty device has been removed, so that, apart from the connection port to the switch 5 the configuration is similar to the original configuration of FIG. 1.

The failover of the good disks to new hot spares can be done in the background at a relatively slow rate so that there is no loss availability to the SAN clients during the process. Depending on the software and system the failover may be a management software failure instruction that results in reconstruction, or the fact that the disks are actually readable is indicated and a simpler transfer process used. Within the context of this specification "failover" is intended to man any transfer of data, including copy or write as well as reconstruction.

In order to operate the procedure described above, only one RAID set is running over the whole SAN, and it will be running on the master file device. With relatively small SANs this is satisfactory, but with larger SANs it could cause a performance bottleneck.

It will be appreciated that the system hot spare 6 will usually be in a different multi-unit device to the one in which the failure occurs. However, in the event that it is the same device, the failed disk is still reconstructed to the spare, then that spare has its data transferred as one of the simulated failures.

Figure 7:
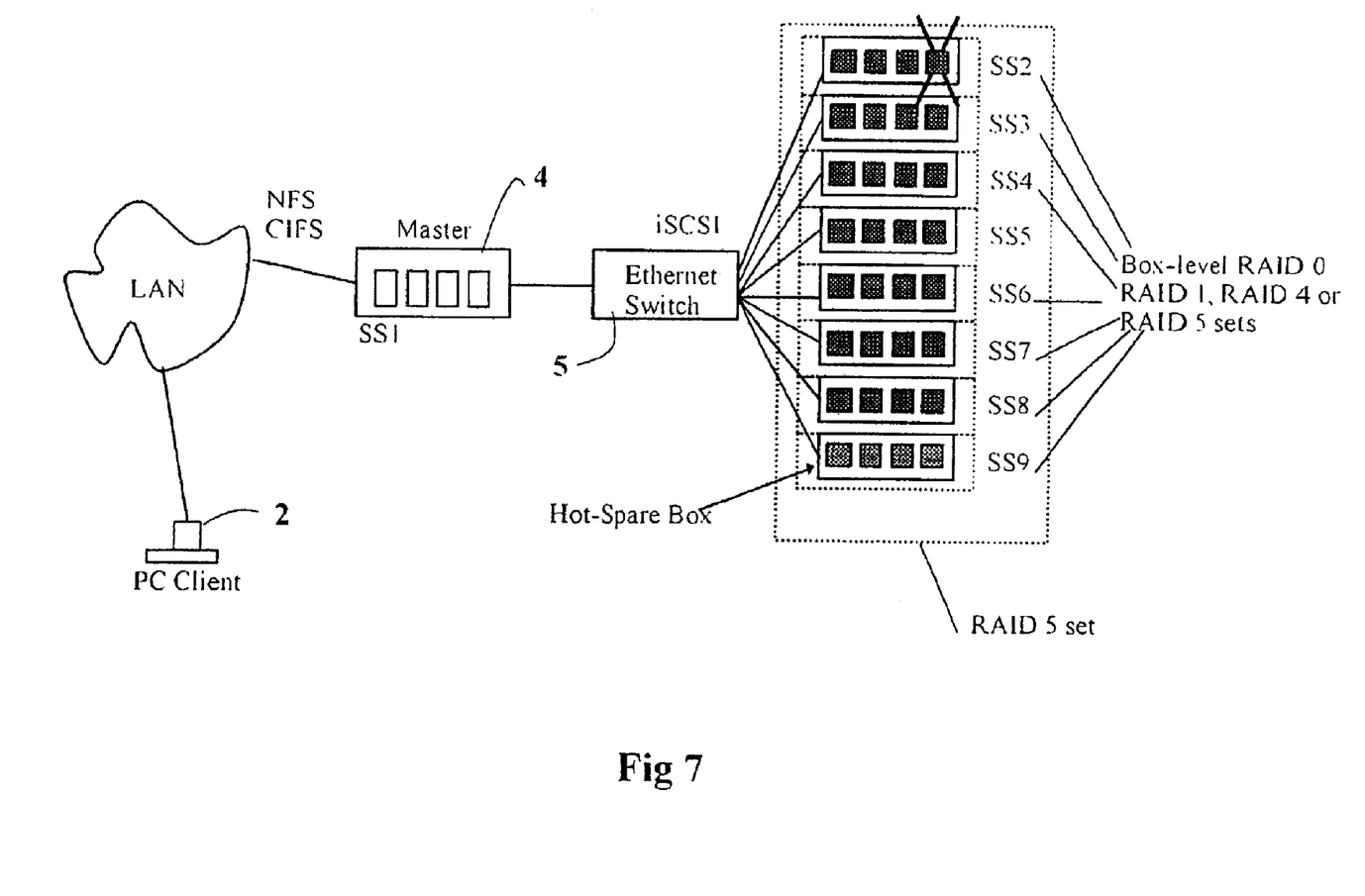
FIG. 7 illustrates a large SAN.

For larger SANs a similar principle can be applied but to avoid an excessive overhead the RAID organisation is different. Referring to FIG. 7, it will be seen that two levels of RAID are running. The SAN of FIG. 7, referenced 13 is much larger. Each slave device or box (SS2, SS3, SS4, SS5, SS6, SS7, SS8 and SS9), for example, has RAID 0 running over its internal disks so that each box appears as a single array. As an alternative to RAID0, other systems or RAID1, RAID4 or RAID5 sets could be used in the boxes. RAID 5 is again running on the master file but instead of running over each of the individual disks it runs over the RAID 0 boxes. This means that in the master filer the storage capacity of a whole box is dedicated to RAID 5 parity, distributed among the boxes. SS9 is dedicated as a hot standby box.

With this arrangement, when there is a drive failure, such as the fourth drive of SS2 as shown in FIG. 7, this is detected by the SAN management software which informs the RAID 5 set, that is the aggregation procedure run on the master filer, of a failure of one of its devices and RAID 5 commences failover to the standby. RAID 5 is running on the master filer and sees boxes as its devices, so when RAID 5 failover is implemented all the data in SS2 is transferred to the hot standby box SS9. The data from the different drives of SS2 can be reconstructed or failed over to SS9 in parallel, so the procedure is faster than in the procedure described for FIGS. 1 to 5. As previously, reconstruction need only be utilised for that part which returns a failure when a device read for that data is performed. It is also envisaged that the RAID0 (or other) box could report to the RAID5 on the master, the details of where there is still good data located, thus allowing the RAID5 master or other equivalent to see inside what is ostensibly presented as a RAID0 device.

Figure 9:
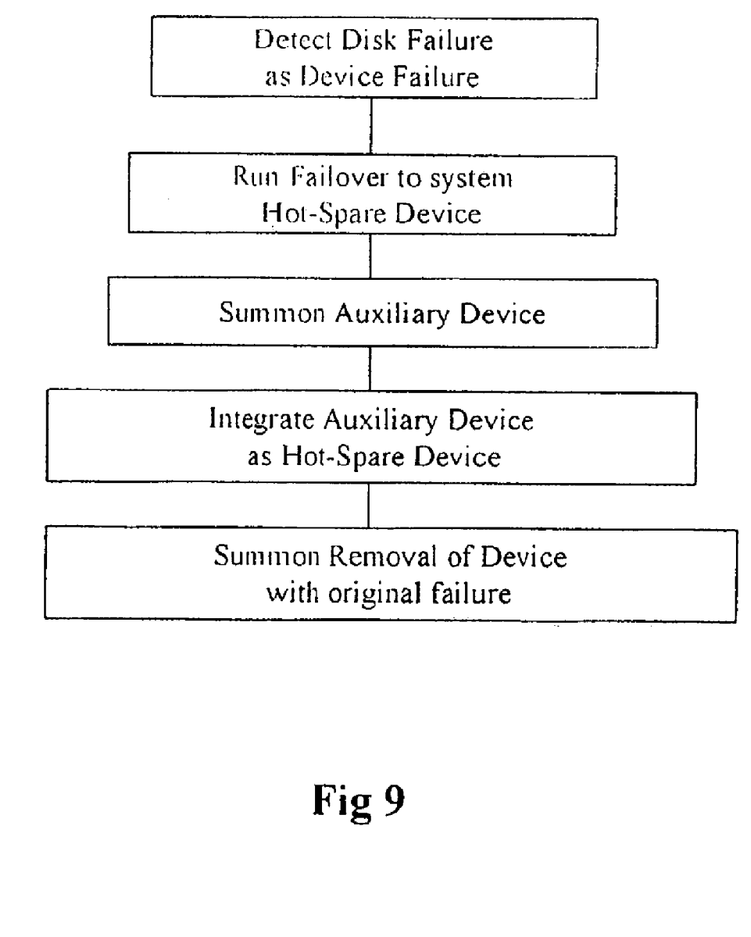
FIG. 9 is a flow diagram of the steps taken in the embodiment of FIG. 7.

Once all the data has been failed over or reconstructed, the management software deletes all the data from the good disks in SS2, and requests the storage administrator to remove it from the SAN. The faulty disk may then be repaired offline and the repaired box, or a replacement box, loaded into the SAN as a hot standby. This procedure for a larger SAN is shown in FIG. 9.

In this system the RAID workload is split among many processors as it is run on, and shared by, the master filer running a master RAID 5 and the slave devices running RAID 0 or other RAID. This prevents bottlenecking and improves performance and scalability.

It will be appreciated that this method will also work for multiple failures within a box, or for a whole box failure For example, if the box power supply failed, reconstruction would occur to the standby box. However, in the power failure instance the subsequent deletion would not take place unless power were restored, and so the management software would need to flag this as there could be a security issue over where the box with readable data is repaired.

With RAID systems, this latter embodiment requires a minimum of four boxes, i.e. three functional and one hot standby.

It will be appreciated that the system, in both embodiments requires a hot spare that is equivalent to one unit aggregated in the RAID procedure run on the master filer, i.e. RAID5 in the example, which requires one disk in the first embodiment or one box in the second embodiment.

What is claimed is:

1. A storage assembly comprising a plurality of multi-unit storage devices running an aggregation and failover procedure that does not require hot-swap capability, the aggregation and failover procedure including
   i) aggregation of individual units into an aggregated storage array;
   ii) responding to failure of a unit by
      a) transferring with reconsideration as required, data from the failed unit to a hot spare unit;
      b) instigating a failover transfer of data from all other units within the same storage device as the failed unit on to hot spare units established in another device;
      c) summoning removal of the device with the failed unit subsequent to completion of the failover transfer; and iii) erasing after said failover transfer the data in those units for which said failover transfer is instigated.

2. A storage assembly and procedure as in claim 1 in which the failover procedure requests provision of an additional storage device and once that device has been provided the failover transfer is instigated on to units in that device.

3. A storage assembly and procedure as in claim 1 in which individual units are aggregated into a plurality of separately aggregated arrays and the plurality of separately aggregated arrays are aggregated by a further aggregation procedure.

4. A storage assembly and procedure as in claim 3 in which the separately aggregated arrays correspond to the multi-unit storage devices.

5. A storage assembly and procedure as in claim 3 in which a spare multi-unit device is provided, and upon failure of a unit, transfer of data from the failed unit and said failover transfer are instigated in parallel.

6. A storage assembly and procedure as in claim 1 in which the transfer of data from the failed unit and failover transfer from the other units is performed sequentially.

7. A storage assembly and procedure as in claim 3 in which the aggregation procedure for the separately aggregated arrays provides information relating to readable data that does not need reconstruction to the further aggregation procedure when there is a failure and failover procedure.

8. A storage assembly comprising a plurality of multi-unit storage devices running an aggregation and failover procedure that does not require hot-swap capability, the aggregation and failover procedure including i) aggregation of individual units into an aggregated storage array; and ii) responding to failure of a unit by (a) transferring with reconstruction as required, data from the failed unit to a hot spare unit;

(b) instigating a failover transfer of data from all other units within the same storage device as the failed unit on to hot spare units established in another device;

(c) summoning removal of the device with the failed unit subsequent to completion of the failover transfer;

wherein said failover transfer is instigated as simulated unit failure.

9. A storage assembly and procedure as in claim 8 in which individual units are aggregated into a plurality of separately aggregated arrays and the plurality of separately aggregated arrays are aggregated by a further aggregation procedure.

10. A storage assembly and procedure as in claim 9 in which the separately aggregated arrays correspond to the multi-unit storage devices.

11. A storage assembly and procedure as in claim 9 in which a spare multi-unit device is provided and, upon failure of a unit, transfer of data from the failed unit and said failover transfer are instigated in parallel.

12. A storage assembly and procedure as in claim 8 in which the transfer of data from the failed unit and failover transfer from the other units is performed sequentially.

13. A storage assembly and procedure as in claim 9 in which the aggregation procedure for the separately aggregated arrays provides information relating to readable data that does not need reconstruction to the further aggregation procedure when there is a failure and failover procedure.

* * * * *